(12) United States Patent
Snelick et al.

(10) Patent No.: US 10,523,082 B2
(45) Date of Patent: Dec. 31, 2019

(54) BEARING ASSEMBLY FOR ELECTRICAL GENERATOR

(71) Applicant: SAFRAN ELECTRICAL & POWER, Blagnac (FR)

(72) Inventors: John Gregory Snelick, Canal Fulton, OH (US); Kevin Patrick McCrea, Cuyahoga Falls, OH (US)

(73) Assignee: SAFRAN ELECTRICAL & POWER, Blagnac (FR)

( * ) Notice: Subject to any disclaimer, the term of this patent is extended or adjusted under 35 U.S.C. 154(b) by 346 days.

(21) Appl. No.: 15/491,889

(22) Filed: Apr. 19, 2017

(65) Prior Publication Data

US 2017/0310188 A1 Oct. 26, 2017

Related U.S. Application Data

(60) Provisional application No. 62/325,709, filed on Apr. 21, 2016.

(51) Int. Cl.
*H02K 15/14* (2006.01)
*H02K 5/16* (2006.01)
(Continued)

(52) U.S. Cl.
CPC .............. *H02K 5/16* (2013.01); *F16C 19/525* (2013.01); *F16C 19/56* (2013.01); *F16C 35/02* (2013.01);
(Continued)

(58) Field of Classification Search
CPC ............ H02K 5/16; H02K 5/173; H02K 7/08; H02K 15/14; H02K 35/042; H02K 35/077;
(Continued)

(56) References Cited

U.S. PATENT DOCUMENTS

| 4,551,032 A | * | 11/1985 | Mottershead | .......... | B23Q 1/265 |
| | | | | | 384/517 |
| 4,560,289 A | * | 12/1985 | Wood, III | ................ | B23Q 1/70 |
| | | | | | 384/535 |

(Continued)

FOREIGN PATENT DOCUMENTS

| FR | 2585095 A1 | 1/1987 |
| JP | 2000-192979 A | 7/2000 |

OTHER PUBLICATIONS

International Search Report and Written Opinion dated Aug. 1, 2017, 17 pages.

*Primary Examiner* — Mang Tin Bik Lian
*Assistant Examiner* — Ahmed Elnakib
(74) *Attorney, Agent, or Firm* — Rankin, Hill & Clark LLP

(57) ABSTRACT

A bearing assembly for an electrical generator includes a frame, a bearing liner and a ring. The frame is configured to connect with a housing of an electrical generator. The frame includes a frame opening and is made from a first material. The bearing liner connects with the frame. The bearing liner is made from a second material, which is dissimilar from the first material. At least a portion of the bearing liner passes through the frame opening. The ring surrounds the bearing liner. The ring contacts the frame and the bearing liner and maintains a clearance between the portion of the bearing liner passing through the frame opening and the frame.

20 Claims, 3 Drawing Sheets

(51) Int. Cl.
*H02K 7/08* (2006.01)
*F16C 19/52* (2006.01)
*F16C 19/56* (2006.01)
*F16C 35/02* (2006.01)
*F16C 35/04* (2006.01)
*F16C 19/54* (2006.01)

(52) U.S. Cl.
CPC ............... *H02K 7/08* (2013.01); *H02K 15/14* (2013.01); *F16C 19/52* (2013.01); *F16C 19/54* (2013.01); *F16C 35/042* (2013.01); *F16C 2380/26* (2013.01)

(58) Field of Classification Search
CPC ........ F16C 19/52; F16C 19/525; F16C 19/56; F16C 35/042; F16C 2380/26; F16C 2202/22; F16C 2240/06; F16C 2326/43; F16C 2208/40
USPC .................................................. 310/89, 90, 91
See application file for complete search history.

(56) References Cited

U.S. PATENT DOCUMENTS

| | | | | |
|---|---|---|---|---|
| 5,073,039 A | * | 12/1991 | Shervington | F16C 19/525 384/278 |
| 5,415,527 A | * | 5/1995 | Godwin | B64C 11/06 416/205 |
| 5,562,349 A | * | 10/1996 | Nespodzany, Jr. | F16C 19/525 384/493 |
| 5,577,847 A | * | 11/1996 | Nakamura | F16C 19/52 384/462 |
| 5,975,764 A | * | 11/1999 | Okada | F16C 19/52 384/476 |
| 6,142,031 A | * | 11/2000 | Phillips | B62D 3/123 384/37 |
| 6,445,099 B1 | * | 9/2002 | Roseman | F16C 19/52 310/68 R |
| 8,511,902 B2 | * | 8/2013 | Heim | B60B 27/001 384/448 |
| 2003/0189382 A1 | * | 10/2003 | Tornquist | F16C 25/08 310/90 |
| 2009/0134730 A1 | * | 5/2009 | Kurokawa | H02K 3/47 310/156.37 |
| 2010/0061674 A1 | * | 3/2010 | Koda | F16C 19/525 384/563 |
| 2011/0305567 A1 | * | 12/2011 | Milfs | F01D 21/045 415/229 |
| 2012/0294559 A1 | * | 11/2012 | Shahamat | F16C 33/581 384/428 |
| 2015/0204383 A1 | * | 7/2015 | Ishii | F04B 1/141 384/297 |
| 2017/0170704 A1 | * | 6/2017 | Snelick | H02K 5/161 |
| 2017/0310188 A1 | * | 10/2017 | Snelick | H02K 5/16 |

* cited by examiner

BEARING ASSEMBLY FOR ELECTRICAL GENERATOR

BACKGROUND

This disclosure relates to electrical generators, and more particularly to electrical generators having bearings for supporting the rotor shaft.

In electrical generators, such as those used to power electrical systems of aircraft, the electrical generator is connected to the main engine of the aircraft by a drive shaft. The drive shaft is connected to a rotor assembly of the electrical generator through a rotor shaft. The rotor assembly is mounted on the rotor shaft and rotates within a stator assembly. The rotor shaft is supported for rotation in a generator housing using bearing assemblies.

Previous electrical generators have been manufactured with light weight aluminum or magnesium frames mounted to a housing of the electrical generator. Hardened steel bearing liners are shrunk fit or cast into the aluminum or magnesium frame, which has also been referred to as an end bell, to provide a low-wear surface to mate with a steel bearing outer ring of the bearing assembly. When so fitted, the combined thermal expansion rate of the aluminum or magnesium frame and steel bearing liner is greater than the thermal expansion rate of the steel bearing outer ring. Therefore the liner expands away from the bearing outer ring which increases the clearance between the liner and the bearing outer ring. This can lead to fretting corrosion and reduced bearing system reliability.

SUMMARY

In view of the foregoing, a novel electrical generator and a novel bearing support assembly for an electrical generator is provided. The electrical generator includes a housing, a stator, a drive shaft, a rotor shaft, a rotor, a bearing support assembly and a bearing. The stator is mounted in the housing. The drive shaft extends from the housing. The rotor shaft is provided in the housing and mounts on the drive shaft. The rotor is mounted on the rotor shaft for rotation with the rotor shaft. The bearing support assembly includes a frame, a bearing liner and a ring. The frame is connected with the housing and includes a frame opening through which the rotor shaft extends. The frame is made from a first material. The bearing liner is connected with the frame. The bearing liner is made from a second material, which is dissimilar from the first material. At least a portion of the bearing liner passes through the frame opening. The ring surrounds the bearing liner. The ring also contacts the frame and the bearing liner and maintains a clearance between the portion of the bearing liner passing through the frame opening and the frame. The bearing is received in the bearing support assembly and contacts the rotor shaft and the bearing liner.

An example of a bearing support assembly for an electrical generator includes a frame, a bearing liner and a ring. The frame is configured to connect with a housing of an electrical generator. The frame includes a frame opening and is made from a first material. The bearing liner connects with the frame. The bearing liner is made from a second material, which is dissimilar from the first material. At least a portion of the bearing liner passes through the frame opening. The ring surrounds the bearing liner. The ring contacts the frame and the bearing liner and maintains a clearance between the portion of the bearing liner passing through the frame opening and the frame.

A method of assembling an electrical generator includes surrounding a portion of a bearing liner with a non-metallic ring, and inserting the portion of the bearing liner through a frame opening in a frame such that the non-metallic ring contacts an inner surface, which defines the frame opening, of the frame. The method further includes mechanically connecting the bearing liner with the frame with the portion of the bearing liner extending through the frame opening, and connecting the frame with the bearing liner connected thereto to a housing of an electrical generator.

DETAILED DESCRIPTION

Figure 1:
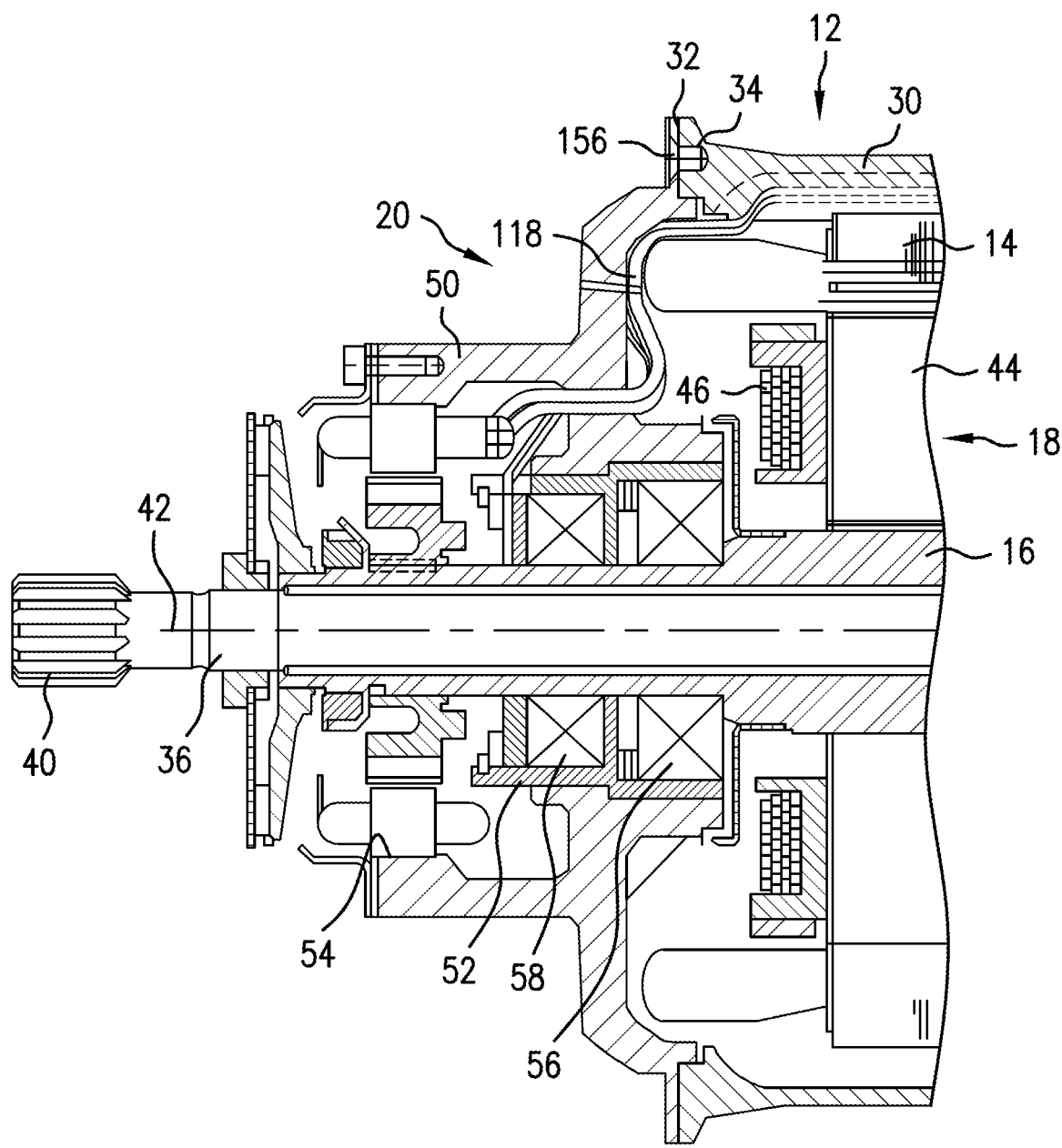
FIG. 1 is a cross-sectional view of a front end of an electrical generator.

FIG. 1 depicts the front end of an electrical generator 10. The electrical generator 10 is similar to electrical generators used in many aircraft. The electrical generator 10 includes a housing 12, stator 14, a rotor shaft 16, a rotor 18, and a bearing support assembly 20. The rear end of the electrical generator 10 is similar in configuration to known electrical generators, and is therefore not shown.

The housing 12 includes an outer cylindrical housing wall 30 having a forward face 32 in which a plurality of fastener openings 34 (only one visible in FIG. 1) are provided for attaching the bearing support assembly 20 to the housing 12. The stator 14 is mounted inside of and is fixed to the outer cylindrical housing wall 30. The rotor shaft 16 is provided in the housing 12. The rotor shaft 16 mounts to a drive shaft 36 that extends from the housing 12. The drive shaft 36 includes a spline 40 at a front end for attachment to a main drive of an engine gear box (not shown). The rotor 18 mounts on the rotor shaft 16 for rotation with the rotor shaft 16 and the drive shaft 36. The rotor 18 rotates about a rotational axis 42 about which the housing 12 is centered. The rotor 18 includes a rotor core 44 and rotor windings 46. The housing 12, the stator 14, the rotor shaft 16, the rotor 18 and the drive shaft 36 can all be similar to those in a known electrical generator.

The bearing support assembly 20 includes a frame 50, which can also be referred to as an end bell, and a bearing liner 52. The frame 50 connects with the housing 12 and includes a centrally located frame opening 54 through which the rotor shaft 16 and the drive shaft 36 extend. The bearing liner 52 connects with the frame 50, and the rotor shaft 16 extends through the frame opening 54. In a known arrangement, the bearing liner 52 is made from a hardened steel, and the frame 50 is made from aluminum or magnesium. The bearing liner 52, which is made from hardened steel to provide a low wear surface for a main bearing 56 and an auxiliary bearing 58, is typically shrunk fit or cast into the aluminum or magnesium frame 50. When so fitted, the combined thermal expansion rate of the frame 50 and bearing liner 52 is greater than the thermal expansion rate of an outer ring for the main bearing 56 or the auxiliary bearing 58. Therefore, the bearing liner 52 expands away from the outer ring of either bearing 56 or 58, which increases the clearance between the two leading to fretting, corrosion, and reduced bearing system reliability.

Figure 2:
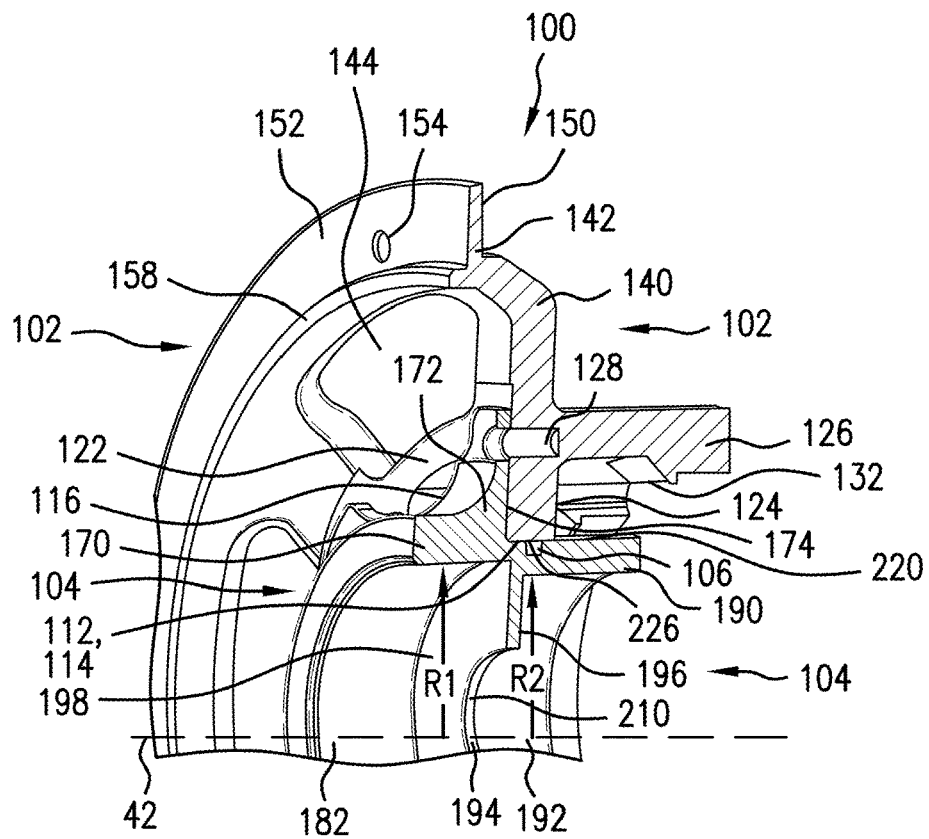
FIG. 2 is a perspective cross-sectional view of a bearing support assembly for an electrical generator.
Figure 3:
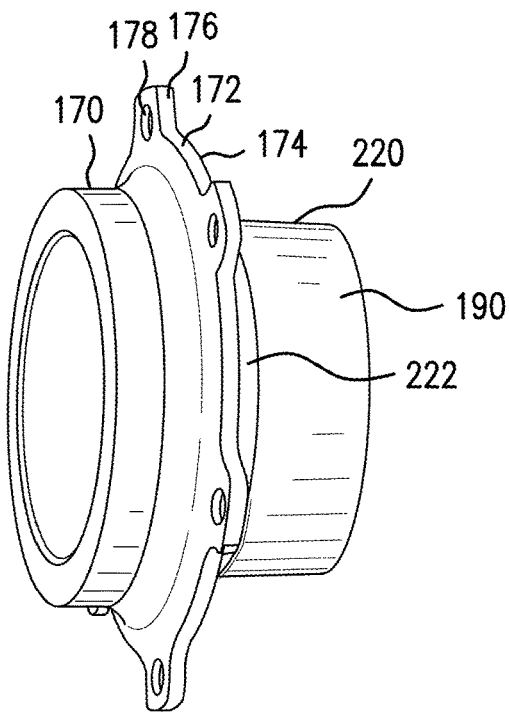
FIG. 3 is a perspective view of a bearing liner of the bearing support assembly shown in FIG. 2.
Figure 4:
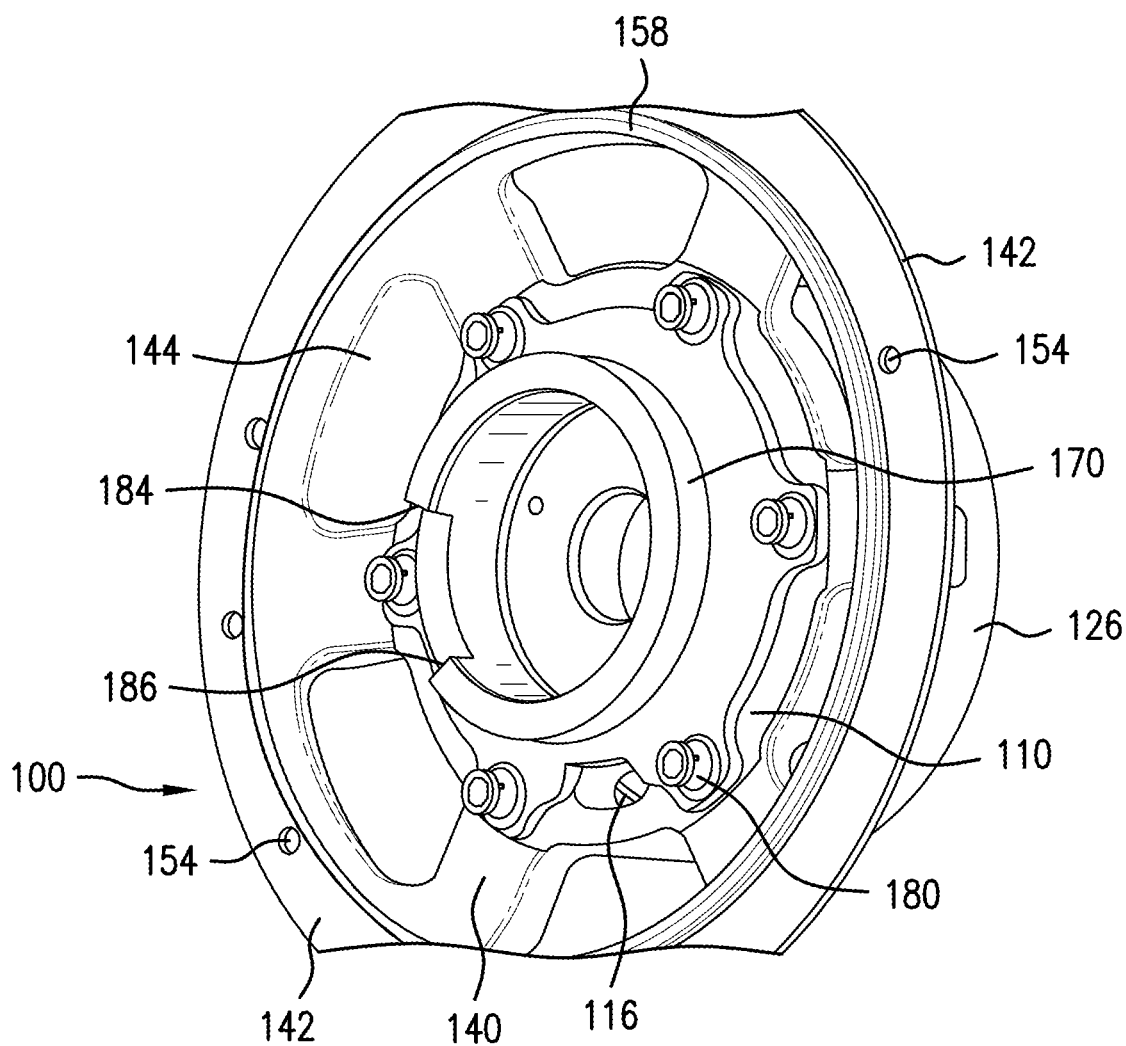
FIG. 4 is a perspective view of the bearing support assembly shown in FIG. 2.

FIGS. 2-4 depict a bearing support assembly 100 that operates in a similar manner to the bearing support assembly 20 in FIG. 1, but is designed to mitigate against the effects of different thermal expansion rates. The bearing support assembly 100 is also designed to mitigate the effects of fretting corrosion and increase bearing system reliability for the electrical generator 10. The bearing support assembly 100 replaces the bearing support assembly 20 shown in FIG. 1, while the remaining components of the electrical generator 10 remain.

FIG. 2 depicts the bearing support assembly 100 including a frame 102, which is similar to the frame 50 shown in FIG. 1, a bearing liner 104, which is similar to the bearing liner 52 shown in FIG. 1, and a ring 106. The frame 102 can connect with the housing 12 in a similar manner as the frame 50 shown in FIG. 1. The bearing liner 104 connects with the frame 102. However, in the embodiment illustrated in FIGS. 2-4, the bearing liner 104 does not connect with the frame 102 by being shrunk fit or cast into the frame 102. The connection between the bearing liner 104 and the frame 102 will be described in more detail below. The frame 102 is made from a first material, which can be either aluminum or magnesium, or other materials similar to the frame 50 shown in FIG. 1. The bearing liner 104 is made from a second material, which is dissimilar from the first material. The bearing liner 104 can be made from hardened steel like the bearing liner 52 shown in FIG. 1.

The ring 106 surrounds the bearing liner 104. The ring 106 contacts the frame 102 and the bearing liner 104. The ring 106 isolates the effects of the difference between the thermal expansion rate of the frame 102 from the thermal expansion rate of the bearing liner 104. The ring 106 can effectively decouple, in a heat transfer sense, the thermal expansion of the bearing liner 104, which is made from hardened steel, from the thermal expansion of the frame 102, which is made from aluminum or magnesium. The ring 106 acts like a thermal expansion absorber to decouple the frame 102 from the bearing liner 104. Such a thermal expansion absorber can be similar to an o-ring or similar to a flat compression ring, and in both cases the absorber can be non-metallic. In addition to the bolts it maintains concentricity during temperature changes as the frame expands or contracts around the liner. Bearings, which can be the same as the main bearing 56 and the auxiliary bearing 58, have an outer ring which is also made of steel. The steel outer ring of these bearings 56, 58 have the same thermal expansion rate as the thermal expansion rate of the bearing liner 104, which controls the clearance between the bearings 56, 58 and the bearing liner 104.

As most clearly seen in FIG. 4, the frame 102 includes a central annular section 110 defining a cylindrical internal surface 112 (FIG. 2), which define a central frame opening 114 that is centered with respect to the rotational axis 42 of the rotor shaft 16, when the bearing support assembly 100 is connected with the housing 12. A lead opening 116 can be provided in the central annular section 110 through which leads 118 (FIG. 1) can extend. The central annular section 110 also includes a rear face 122 and a forward face 124, both of which are planar and normal to the rotational axis 42.

The frame 102 also includes a forward cylindrical section 126 that extends forwardly from the forward face 124. The forward cylindrical section 126 is also centered with respect to the rotational axis 42. The frame 102 further includes a plurality of fastener holes 128 provided in the central annular section 110. The fastener holes 128 are radially offset from the rotational axis 42 equal distance with an inner surface 132 of the forward cylindrical section 126. The fastener holes 128 extend forwardly from the rear face 122 of the central annular section 110 to facilitate connection of the bearing liner 104 to the frame 102.

The frame 102 further includes a plurality of spokes 140 that extend in a radial direction from the central annular section 110. The spokes 140 are circumferentially spaced around the central annular section 110 and connect with an outer annular section 142 so as to define a plurality of openings 144 between the outer annular section 142, the central annular section 110, and adjacent spokes 140. The outer annular section 142 defines a forward surface 150 and a rear surface 152. The forward surface 150 is parallel to the rear surface 152, and both surfaces 150, 152 are normal to the rotational axis 42. A plurality of bolt holes 154 are provided through the outer annular section 142 extending from the forward surface 150 through the outer annular section 142 to the rear surface 152. The bolt holes 154 can align with the fastener openings 34 (FIG. 1) and the housing 12 (FIG. 1) to allow for the attachment of the frame 102 to the housing 12 through the use of fasteners 156 (FIG. 1). The outer annular section 142 also includes an axially extending mating flange 158 that can key with the housing 12 in a manner similar to the frame 50 shown in FIG. 1.

The bearing liner 104 connects with the frame 102 such that at least a portion of the bearing liner 104 passes through the central frame opening 114. In the bearing support assembly 100 illustrated in FIGS. 2-4, the bearing liner 104 includes a rear annular section 170 that transitions into a radially outwardly extending flange 172. The radially outwardly extending flange 172 defines a forward surface 174 that contacts the rear face 122 of the central annular section 110 of the frame 102 when the bearing liner 104 is connected with the frame 102.

With respect to FIG. 3, a plurality of ears 176 extend radially outward from the radially outwardly extending flange 172. A respective fastener opening 178 is provided in each ear 176. Each fastener opening 178 aligns with a respective fastener hole 128 and receives a fastener 180, which can be a conventional style bolt, to connect the bearing liner 104 with the frame 102. The rear annular section 170 also defines a first bearing support surface 182, which is an inner cylindrical surface of the rear annular section 170. The first bearing support surface 182 is centered with respect to the rotational axis 42 and is configured to support the main bearing 56 shown in FIG. 1. The first bearing support surface 182 is offset from a centerline of the bearing liner 104, which is co-axial with the rotational axis 42, a distance R1. The rear annular section 170 extends axially away from the radially outwardly extending flange 172 and defines a rear end face 184 normal to the centerline (rotational axis 42) of the bearing liner 104. An anti-rotation feature, e.g., a notch 186, is provided in the rear end face 184.

The bearing liner 104 also includes a forward annular section 190 that extends forwardly from the forward surface 174 of the radially outwardly extending flange 172. The forward annular section 190 defines a second bearing support surface 192 that is configured to support the auxiliary bearing 58 depicted in FIG. 1. The first bearing support surface 182 and the second bearing support surface 192 are separated by an internal wall 194. The internal wall 194 is provided to keep debris from the main bearing 56, if it were to fail, from damaging the auxiliary bearing 58. The internal wall 194 includes a forward side 196 facing toward the second bearing support surface 192 and a rear side 198 facing toward the first bearing support surface 182. The forward side 196 is parallel with the rear side 198, and both sides 196, 198 of the internal wall 194 are planar and normal to the rotational axis 42, which can also be a centerline of the bearing liner 104. The internal wall 194 extends inwardly and defines a central opening 210 that receives the rotor shaft 16 (FIG. 1) when the bearing support assembly 100 is connected with the housing 12. The opening 210 is circular and centered on the rotational axis 42. The second bearing support surface 192 is offset from the centerline of the bearing liner 104, which is co-axial with the rotational axis 42, a distance R2. In the illustrated embodiment, R1 is greater than R2.

The bearing liner 104 also includes an outer surface 220 on the forward annular section 190 forward of the forward surface 174 of the radially outwardly extending flange 172. With respect to FIG. 3, a groove 222 is provided in the outer surface 220 and extends inwardly from the outer surface 220 into the forward annular section 190. With respect back to FIG. 2, the ring 106 is received in the groove 222. The groove 222 is positioned on a forward axial side of the internal wall 194, which places the groove 222 on the same axial side of the internal wall 194 as the second bearing support surface 192.

The ring 106 is received in the groove 222 such that an exposed surface 226 of the ring 106, with respect to the groove 222, is substantially flush with, although slightly radially outwardly offset from, the outer surface 220 of the forward annular section 190. If desired, multiple grooves, similar to the groove 222, and multiple rings, similar to the ring 106, could be provided if there is sufficient length to maintain alignment. The ring 106 can be an O-ring that offsets the outer surface 220 of the bearing liner 104 from the internal surface 112 of the frame 102. The ring 106 can be made from a bearing grade polyimide, such as Vesper) or a fluoroelastomer. This separates the aluminum or magnesium frame 102 from the steel bearing liner 104 so that the thermal rate of expansion of the bearing liner 104 can be equal to or nearly the same as the thermal rate of the expansion of the respective outer rings of bearings 56, 58 (FIG. 1) received in the bearing liner 104. The ring 106 is used as a primary centering device to assure proper concentricity of the bearings 56, 58 and the rotor shaft 16 with no actual interference between the bearing liner 104 and the frame 102. The ring 106 absorbs the interference for the initial installation of the bearing liner 104 and the frame 102. In addition to centering the bearing support assembly provided by the ring 106, the bearing liner 104 is bolted in place using bolts 180 to ensure proper alignment and safety wire (not shown) can be installed to prevent tampering.

The electrical generator 10 can be assembled by surrounding a portion of the bearing liner 104 with a non-metallic ring, such as the ring 106. Next, that portion of the bearing liner 104 can be inserted through the frame opening 114 such that the non-metallic ring contacts the internal surface 112, which defines the frame opening 114, of the frame 102. The bearing liner 104 is then connected with the frame 102 with the portion of the bearing liner 104 extending through the frame opening 114. The frame 102 with the bearing liner 104 connected thereto is then connected to the housing 12 of the electrical generator 10. The connection between the bearing liner 104 and the frame 102 is a bolted mechanical connection, which differs from being shrunk fit or cast into the frame 102.

An electrical generator and a bearing support assembly for an electrical generator have been described above with particularity. Modifications and alterations will occur to those upon reading and understanding the preceding detailed description. The invention, however, is not limited to only the embodiments described above. Instead, the invention is broadly defined by the appended claims and the equivalents thereof. Moreover, it will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An electrical generator comprising:
   a housing;
   a stator mounted in the housing;
   a drive shaft extending from the housing;
   a rotor shaft provided in the housing and mounted on the drive shaft;
   a rotor mounted on the rotor shaft for rotation with the rotor shaft; and
   a bearing support assembly including
      a frame connected with the housing, the frame including a frame opening through which the rotor shaft extends, the frame being made from a first material;
      a bearing liner connected with the frame, the bearing liner being made from a second material, which is dissimilar from the first material, and at least a portion of the bearing liner passing through the frame opening, wherein the bearing liner includes a first bearing support surface and a second bearing support surface separated by an internal wall;
      a ring surrounding the bearing liner, the ring contacting the frame and the bearing liner and maintaining a clearance between the portion of the bearing liner passing through the frame opening and the frame, wherein the ring is axially offset from the internal wall, and
   a bearing received in the bearing support assembly and contacting the rotor shaft and the bearing liner.

2. The electrical generator of claim 1, wherein the ring is an O-ring made from a polyimide or a fluoroelastomer.

3. The electrical generator of claim 2, wherein the bearing liner includes an outer groove formed in an outer surface of the bearing liner and the O-ring is received in the outer groove.

4. The electrical generator of claim 1, wherein the ring is a non-metallic ring.

5. The electrical generator of claim 1, wherein the first bearing support surface is offset from a centerline of the bearing liner a distance R1 and the second bearing support surface is offset from the centerline a distance R2, wherein R1 is greater than R2.

6. The electrical generator of claim 5, wherein the ring is positioned on a same axial side of the internal wall as the second bearing support surface.

7. The electrical generator of claim 1, wherein the bearing liner includes a radially outwardly extending flange and a plurality of ears each extending radially outwardly from the radially outwardly extending flange, each ear having a fastener opening.

8. The electrical generator of claim 7, wherein the bearing liner includes an annular section extending axially away from the radially outwardly extending flange, wherein the annular section defines an end face normal to a centerline of the bearing liner, and an anti-rotation feature is provided in the end face.

9. The electrical generator of claim 8, wherein the anti-rotation feature is a notch formed in the end face.

10. The electrical generator of claim 1, wherein the frame includes an inner surface that defines the frame opening and an outer surface of the portion of the bearing liner passing through the frame opening is offset radially inward of the inner surface.

11. A bearing support assembly for an electrical generator comprising:
 a frame configured to connect with a housing of the electrical generator, the frame including a frame opening and being made from a first material;
 a bearing liner connected with the frame, the bearing liner being made from a second material, which is dissimilar from the first material, and at least a portion of the bearing liner passing through the frame opening, wherein the bearing liner includes a first bearing support surface and a second bearing support surface separated by an internal wall; and
 a ring surrounding the bearing liner, the ring contacting the frame and the bearing liner and maintaining a clearance between the portion of the bearing liner passing through the frame opening and the frame, wherein the ring is axially offset from the internal wall.

12. The bearing support assembly of claim 11, wherein the bearing liner includes an outer groove formed in an outer surface of the bearing liner and the ring is received in the outer groove.

13. The bearing support assembly of claim 12, wherein the ring is a non-metallic O-ring.

14. The bearing support assembly of claim 11, wherein the first bearing support surface is offset from a centerline of the bearing liner a distance R1 and the second bearing support surface is offset from the centerline a distance R2, wherein R1 is greater than R2, and the ring is positioned on a same axial side of the internal wall as the second bearing support surface.

15. The bearing support assembly of claim 11, wherein the frame includes a plurality of fastener holes and the bearing liner includes a radially outwardly extending flange and a plurality of ears each extending radially outwardly from the radially outwardly extending flange, each ear having a fastener opening that aligns with a respective fastener holes to receive a fastener to connect the frame with the bearing liner.

16. The bearing support assembly of claim 11, wherein the frame includes an inner surface that defines the frame opening and an outer surface of the portion of the bearing liner passing through the frame opening is offset radially inward of the inner surface.

17. An electrical generator comprising:
 a housing;
 a stator mounted in the housing;
 a drive shaft extending from the housing;
 a rotor shaft provided in the housing and mounted on the drive shaft;
 a rotor mounted on the rotor shaft for rotation with the rotor shaft; and
 a bearing support assembly including
  a frame connected with the housing, the frame including a frame opening through which the rotor shaft extends, the frame being made from a first material;
  a bearing liner connected with the frame, the bearing liner being made from a second material, which is dissimilar from the first material, and at least a portion of the bearing liner passing through the frame opening, wherein the bearing liner includes a radially outwardly extending flange and a plurality of ears each extending radially outwardly from the radially outwardly extending flange, each ear having a fastener opening, and wherein the bearing liner includes an annular section extending axially away from the radially outwardly extending flange, wherein the annular section defines an end face normal, to a centerline of the bearing liner, and an anti-rotation feature is provided in the end face;
  a ring surrounding the bearing liner, the ring contacting the frame and the bearing liner and maintaining a clearance between the portion of the bearing liner passing through the frame opening and the frame, and
 a bearing received in the bearing support assembly and contacting the rotor haft and the bearing liner.

18. The electrical generator of claim 17, wherein the anti-rotation feature is a notch formed in the end face.

19. The electrical generator of claim 17, wherein the frame includes an inner surface that defines the frame opening and an outer surface of the portion of the bearing liner passing through the frame opening is offset radially inward of the inner surface.

20. The electrical generator of claim 17, wherein the ring is an O-ring made from a polyimide or a fluoroelastomer, and wherein the bearing liner includes an outer groove formed in an outer surface of the bearing liner and the O-ring is received in the outer groove.

* * * * *